(12) United States Patent
Kroczek et al.

(10) Patent No.: US 11,815,190 B2
(45) Date of Patent: Nov. 14, 2023

(54) FLUID LEVEL SENSING ASSEMBLY FOR MOTORISED VALVE

(71) Applicant: Goodrich Corporation, Charlotte, NC (US)

(72) Inventors: Piotr Kroczek, Dolnośląskie (PL); Dariusz Sapija, Dolnośląskie (PL); Agata Kurowska, Kowale (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/550,031

(22) Filed: Dec. 14, 2021

(65) Prior Publication Data
US 2022/0196171 A1    Jun. 23, 2022

(30) Foreign Application Priority Data

Dec. 22, 2020 (EP) .................................... 20461602

(51) Int. Cl.
*F16K 21/18* (2006.01)
*F16K 31/36* (2006.01)

(52) U.S. Cl.
CPC .............. *F16K 21/18* (2013.01); *F16K 31/36* (2013.01); *Y10T 137/7761* (2015.04)

(58) Field of Classification Search
CPC ........ F16K 21/18; F16K 31/36; F16L 41/023; F16L 41/021; F16L 41/008; F16L 41/025; F16L 41/026; F16L 41/028; Y10T 137/776–777; G01F 23/02–28; G01F 23/0007; G01L 19/0007
USPC ..... 137/393, 487.5–492.5, 551–559, 315.01, 137/884; 285/131.1, 132.1; 251/6–8
See application file for complete search history.

(56) References Cited

U.S. PATENT DOCUMENTS

| | | | | |
|---|---|---|---|---|
| 4,484,601 A * | 11/1984 | Campau | ................... | F15C 1/005 |
| | | | | 137/841 |
| 4,631,001 A * | 12/1986 | Keech | ...................... | G05D 9/12 |
| | | | | 137/515.5 |
| 5,064,314 A | 11/1991 | Grooms et al. | | |
| 10,215,597 B2 * | 2/2019 | Gagne | ................... | G01D 11/245 |
| 10,451,451 B2 * | 10/2019 | Gagne | ..................... | G01F 15/14 |
| 11,015,962 B2 * | 5/2021 | Gagne | ................... | G01L 19/144 |
| 2006/0202475 A1 | 9/2006 | Gunderson | | |
| 2007/0168150 A1 * | 7/2007 | Hirata | ................. | G01L 19/0023 |
| | | | | 702/138 |

(Continued)

OTHER PUBLICATIONS

Extended European Search Report for International Application No. 20461602.3 dated Jun. 29, 2021, 6 pages.

*Primary Examiner* — Craig J Price
(74) *Attorney, Agent, or Firm* — CANTOR COLBURN LLP

(57) ABSTRACT

A fluid level sensor assembly includes a first pipe component defining a flow path for the fluid and configured to be attached to a valve to control flow of the fluid from the first pipe component, and a fluid level sensor arranged in or on the first pipe component to detect a level of fluid in the first pipe component and to generate a command signal for operation of the valve according to the level detected. The assembly also includes an insert fitted to an end of the first pipe component and extending axially from the end to be fitted to an inlet of the valve, in use, wherein the insert is configured to secure the first pipe component against rotation relative to the valve inlet when the insert is fitted to the inlet.

8 Claims, 6 Drawing Sheets

(56) References Cited

U.S. PATENT DOCUMENTS

| | | | |
|---|---|---|---|
| 2012/0042960 A1 | 2/2012 | Muraki | |
| 2013/0240074 A1* | 9/2013 | Hartwig | F16K 27/003 |
| | | | 137/884 |
| 2013/0277580 A1* | 10/2013 | Deperraz | F16K 31/025 |
| | | | 251/7 |
| 2018/0338435 A1* | 11/2018 | Darnold | A01G 25/16 |
| 2022/0205536 A1* | 6/2022 | Kurowska | F16J 15/025 |
| 2023/0175626 A1* | 6/2023 | Sapija | F16L 41/008 |
| | | | 285/131.1 |

* cited by examiner

FLUID LEVEL SENSING ASSEMBLY FOR MOTORISED VALVE

CROSS-REFERENCE TO RELATED APPLICATIONS

This application claims priority to European Patent Application No. 20461602.3 filed Dec. 22, 2020, the entire contents of which are incorporated herein by reference.

TECHNICAL FIELD

The present disclosure is concerned with providing a level sensor assembly for controlling operation of a valve to control fluid flow dependent on the level of fluid sensed by the sensor. The assembly is particularly for mounting a water (or other fluid) level sensor to a flow line that is in communication with a valve, particularly a motorised valve.

BACKGROUND

There are many applications, in various fields, where a fluid flow is regulated or controlled by opening and closing valves. In water supply or sanitation systems, for example, the flow of water through the system is managed by opening and closing valves to allow, block or direct the flow of water. Manually operated valves may be opened or closed by turning a handle or lever. Many systems use automatic or motorised valves that are opened or closed by means of an electric motor. In some systems, the opening or closing of the valves is dependent on the level of water in a part of the system. In some cases, a valve may be arranged to open in response to a water level exceeding a threshold level. In other cases, a valve may be normally open and configured to close in response to the water exceeding a threshold level. One example of the use of automatic valves responsive to water levels is in a so-called grey water system. Grey water is water in a system that has been used but that can be recycled for a different purpose e.g. drinking water or water from a wash basin can be recycled for use in a toilet flushing system. Grey water systems are often used in building complexes or in aircraft. Valves are provided to direct and control the flow of grey water to the flush. Grey water systems are just one example of a system in which a valve is controlled based on a sensed fluid level.

Designers of such fluid management systems face challenges in designing and mounting the level sensors to ensure accurate sensing and, thus, accurate control of the valves. Sensors located in the pipes through which the fluid flows can disrupt flow of the fluid. Further, sensors can become contaminated by particles and debris in the fluid. The positioning and location of the sensor is important and presents challenges.

There is therefore a need for an improved level sensor assembly for use in association with motorised valves.

SUMMARY

According to one aspect, there is provided a fluid level sensor assembly comprising a first pipe component defining a flow path for the fluid and configured to be attached to a valve to control flow of the fluid from the first pipe component, and a fluid level sensor arranged in or on the first pipe component to detect a level of fluid in the first pipe component and to generate a command signal for operation of the valve according to the level detected, and an insert fitted to an end of the first pipe component and extending axially from the end to be fitted to an inlet of the valve, in use, wherein the insert is configured to secure the first pipe component against rotation relative to the valve inlet when the insert is fitted to the inlet.

Preferably, the first pipe component is a wye fitting defining a first branch that defines the fluid path and a second branch in which the sensor is located.

A clamp such as a clamshell may be provided to fit around the first pipe component and the valve inlet when they are connected.

The wye-fitting may be provided with a nozzle to direct fluid from an inlet end to the branch in which the sensor is located, the nozzle having a first opening at the inlet end and a second, smaller opening at an outlet end directed to the sensor.

Also provided is a fluid level sensor assembly comprising a wye fitting having a main branch defining a fluid path for a fluid to flow from an inlet end to an outlet end arranged to be connected to an inlet of a valve, and a second branch opening from the main branch at a position intermediate the inlet end and the outlet end and in which a level sensor is located to detect a level of fluid in the second branch and to generate a command signal for operation of the valve according to the level detected, and further comprising a nozzle defining a channel outside the main branch, the channel having a first opening from the main branch, at a position intermediate the inlet end and the second branch, and a second opening into the second branch, the second opening being smaller than the first opening.

An insert may be fitted to the outlet end of the wye fitting and extending axially from the end to be fitted to an inlet of a valve, in use, wherein the insert is configured to secure the wye fitting against rotation relative to the valve inlet when the insert is fitted to the valve inlet.

The insert e.g. of polymer may comprise locking features such as teeth, latches or the like, to provide an anti-rotation fit between the outlet end and the valve inlet.

Also provided is a fluid management system comprising a valve and an assembly as described above. The assembly may also include a fluid pipe arranged for connection with the valve via the assembly.

Preferred embodiments will now be described, by way of example only, with reference to the accompanying drawings.

DETAILED DESCRIPTION

Figure 1:
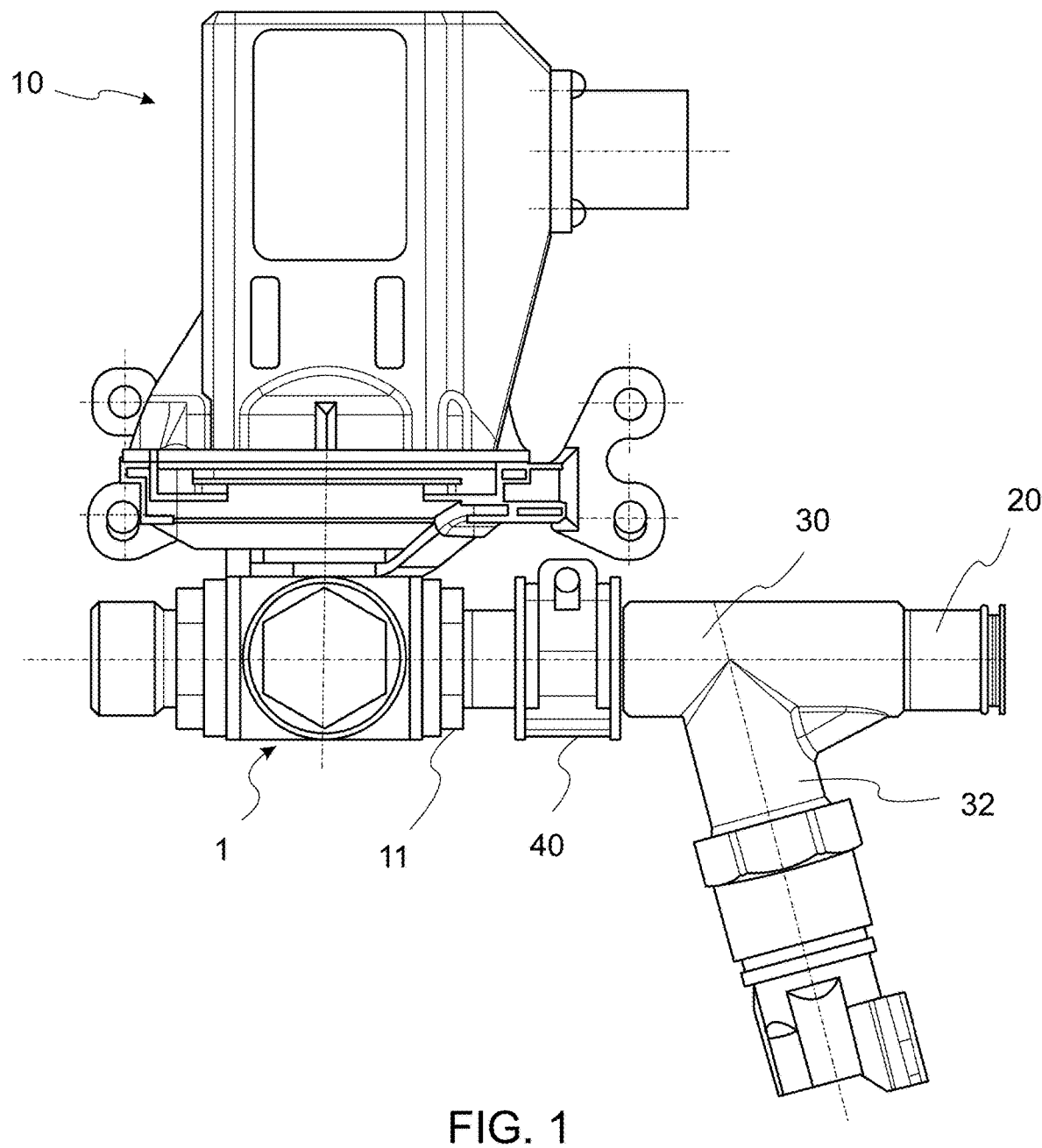
FIG. 1 shows a valve and water level sensor assembly according to the present disclosure.
Figure 2:
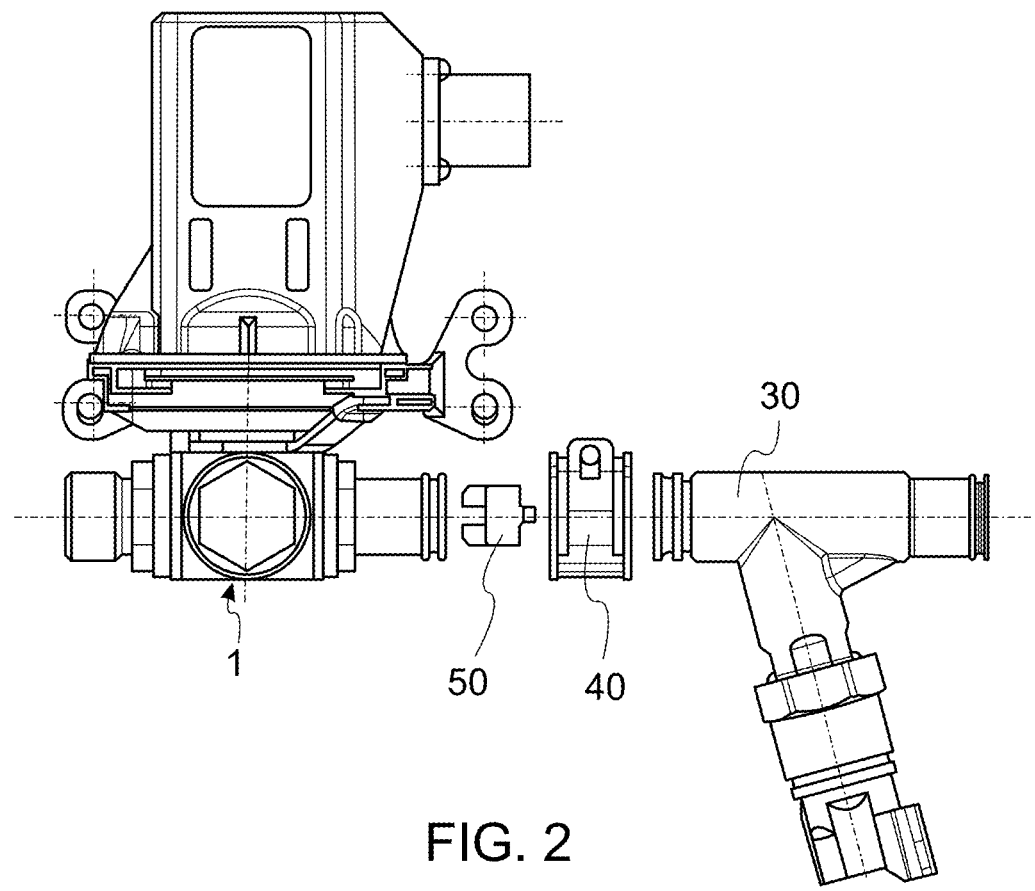
FIG. 2 is an exploded view of the assembly of FIG. 1.

Referring first to FIGS. 1 and 2, the assembly of the disclosure will be described, by way of example only, for a system comprising a valve 1 connected between a first part of a water system e.g. a reservoir 10 and another part of the water system e.g. waste pipe 20. Depending on the type of water system, the valve 1 may be a normally open valve or a normally closed valve. Opening and closing of the valve 1 is controlled based on a water level in the system detected by a water level sensor 2. For a normally open valve, the valve motor is commanded to close the valve if the sensor detects a water level above a given threshold. For a normally closed valve, the valve motor is commanded to open the valve if the sensor detect a water level above a give threshold. For the following description, a normally closed valve will be used, by way of example only. The same principles will, however, apply to a normally open valve.

As seen in the drawings, the level sensor 2 is mounted in a wye fitting 30 attached between the valve inlet 11 and the waste pipe 20. One branch 31 of the wye fitting 30 is in line with the waste pipe 20. The other branch 32 of the wye fitting extends from the first branch at an angle e.g. 45 degrees. The level sensor 2 is mounted in the second branch out of, but close to the flow of water through the waste pipe.

A connector e.g. a clamshell 40, described further below, joins the wye fitting 30 to the valve inlet 11.

In the example shown, while the waste pipe is empty, the valve 1 is closed. As water starts to fill the waste pipe (FIG. 3(*a*)) it approaches the branch of the wye fitting in which the sensor 2 is located. Water continues (FIG. 3(*b*)) to flow along the pipe 20 and is blocked (FIG. 3(*c*)) by the closed valve 1. As more water flow into the waste pipe 20, it starts to fill the wye branch 32 where the sensor 2 is located (FIG. 3(*d*)). When the sensor is covered (FIG. 3(*e*)) it sends a command signal to the motor (not shown) to cause the valve 1 to open. In a grey water system as mentioned above, for example, this then allows the accumulated water to be released into the flush system.

As mentioned above, it is important for reliable operation of the sensor and the valve that the sensor is fixed in the correct location and orientation. Whilst the sensor can be fixedly secured in the wye fitting, it is also important to ensure that the connection between the wye fitting and the valve inlet is such as to secure the position and orientation of the wye fitting itself.

Conventionally, in such systems, fittings and pipes are connected by a so-called clam shell connector 40 which is a one-piece connector consisting of two halves joined by a hinge area which allows the structure to come together to close. Such connectors are quick and easy to use and provide secure attachment of components. A clam shell connector, however, does not secure the relative orientation of two connected pipe components and without additional fixing components or adhesives, the connected pipes will be able to rotate relative to each other. This makes clam shells unsuitable for an arrangement in which the level sensor is provided in the wye fitting as described above.

One aspect of this disclosure, therefore, is to provide an alternative structure that enables a clam shell connector to be used to secure the parts together but ensure a fixed orientation of the connected parts. This is provided by means of an insert 50 that will now be described with reference to FIGS. 4, 5, 8 and 9.

Figure 9:
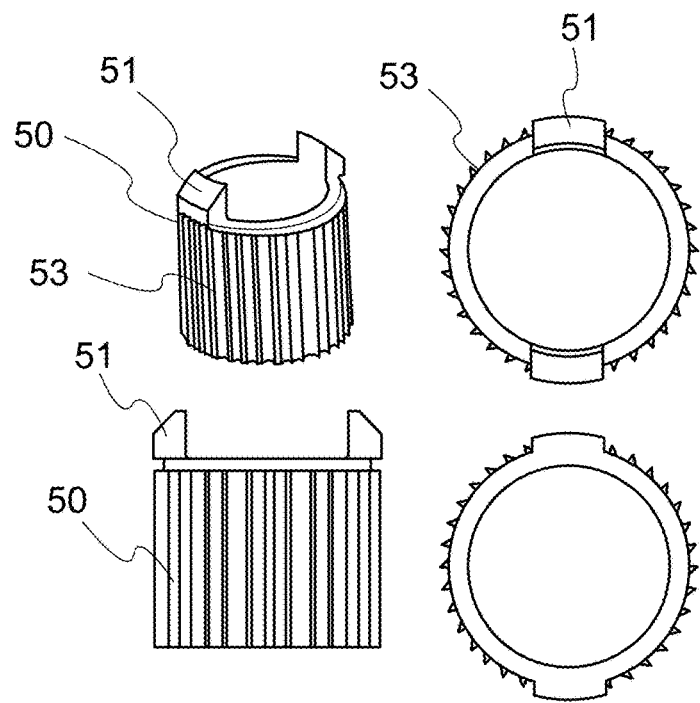
FIG. 9 is a detailed view of a connection insert according to another example.

The insert 50 is configured to be fitted into the valve inlet 11 and the wye fitting 30 such that it extends, in the flow path, to bridge the join between the valve and the wye fitting. The insert 50 is in the form of a ring or sleeve, so as not to hinder flow of the fluid, and is provided with locking features such that it is secured to the valve inlet and the wye fitted in a non-rotatable manner and such that the wye fitting cannot rotate relative to the wye fitting. The insert 50 may be provided by locking or keying features that engage with or mate with opposing features provided on the wye fitting and the valve inlet or that otherwise tightly engage e.g. by a form or friction fit with the wye fitting and the valve inlet. The locking features may be in the form of projections or latches 51 that engage in detents or slots 34 in the end of the wye fitting 30 and teeth 52 or protuberances that provide a form fit of friction fit with the valve inlet but other forms of locking may also be provided so long as rotation of the parts relative to each other is prevented due to the insert 50. In the preferred example, a friction fit is provided for connection to the valve inlet so that the insert 50 can be connected to any standard valve inlet ports using clamshells. The other side of the insert fits to the wye fitting which can be a custom part and various options are available for fitting the insert to this part. Thus, the insert can have different fittings on its two sides. The insert preferably has some flexibility and should have relative small dimensions to minimise disruption to the flow. A polymer insert has been found to work well. Metal and plastic inserts are also feasible. In environments where there is a lot of vibration or other forms of impact or harsh conditions, the insert 50 may be provided with a greater number of locking features e.g. circumferential teeth 53 as shown in FIG. 9. For use with a standard valve inlet/wye fitting, that has not been formed with cooperating locking means, teeth or other protuberances will provide a universal locking insert.

Although described for an assembly in which the sensor is mounted in a wye fitting, the improved connection could also have benefits in arrangements where the sensor is mounted in a simple pipe fitted to the valve inlet.

Another problem with sensors mounted as described above is that the area where the level sensor 2 is located can become contaminated with dirt or mud or other pollutants in the water. This can make the sensor less accurate or even damage the sensor, thus adversely affecting the water flow function and also risks the growth of fungus/development of bacteria in the system.

According to another aspect of the disclosure, therefore, the assembly is constructed to provide cleaning of the sensor during use. This aspect, as will be described below, provides benefits independently of and also together with the connection insert feature described above.

Figure 6:
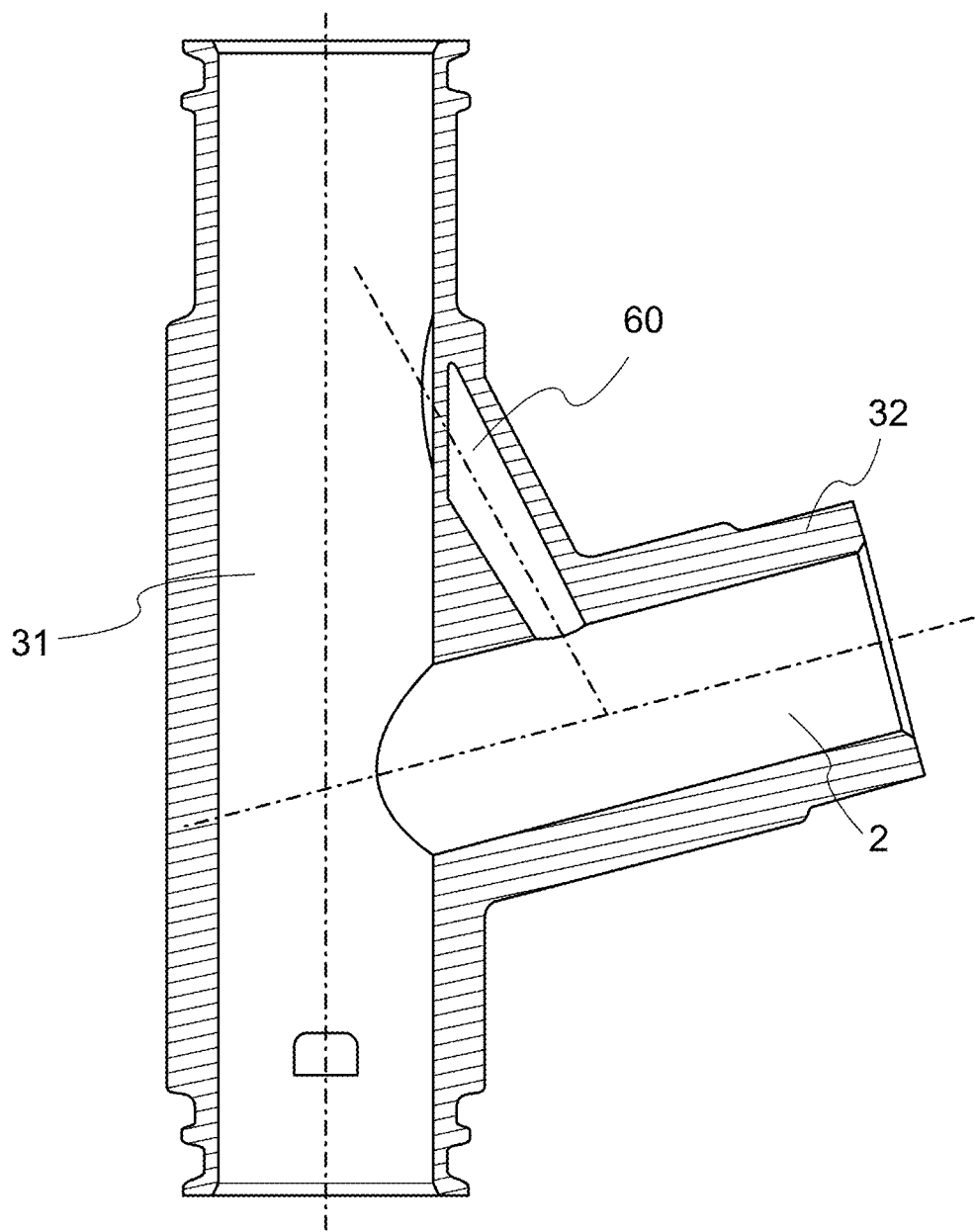
FIG. 6 is a cross section view of a further embodiment of an assembly according to the disclosure.
Figure 7:
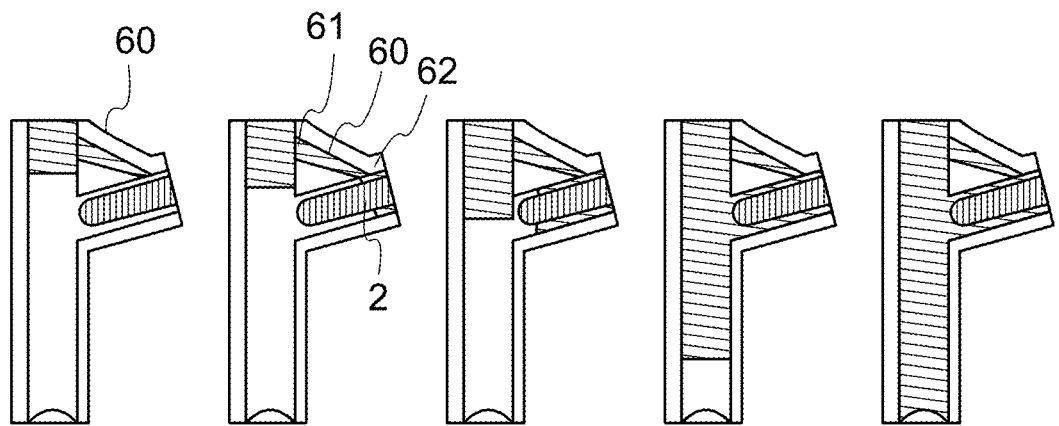
FIGS. 7a-7e show the water flow in an assembly such as that shown in FIG. 6.
Figure 8:
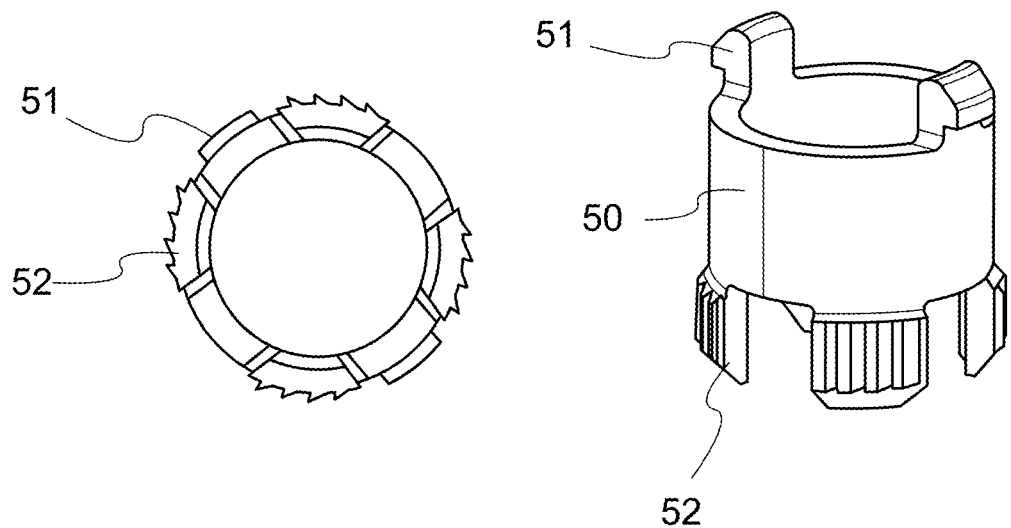
FIG. 8 is a detailed view of a connection insert according to one example.
Figure 10:
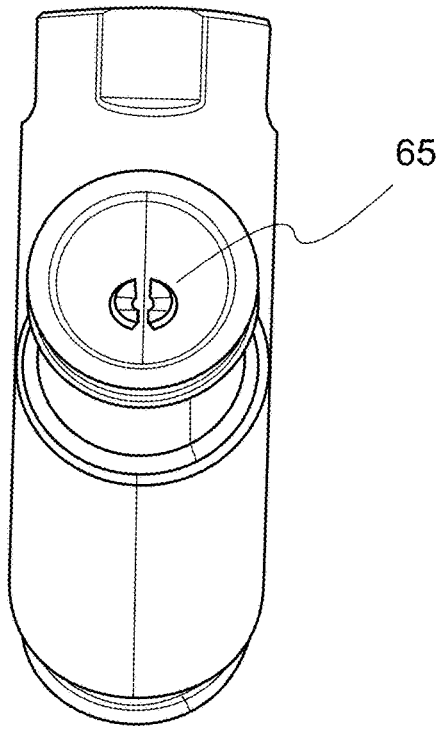
FIG. 10 is a perspective view of a detail of an assembly according to the disclosure.

The second aspect will be described with particular reference to FIGS. 6, 7 and 10.

As above, the level sensor 2 is mounted in the second branch 32 of the wye fitting 30. Here, in this embodiment, though, one or more additional nozzles 60 or flow channels are provided from the first branch 31, upstream of the opening of the second branch 32, to a downstream location of the second branch 32, where the sensor 2 is located. These nozzles 60 are tapered from a wider opening 61 at the interface with the first branch 31 to a narrower opening 62 at the interface with the second branch 32. The tapering increases the water pressure at the smaller opening. The nozzles 60 may also be provided with a filter 65, shown in FIG. 10, to prevent the ingress of larger contaminant particles. The filter could be a solid filter formed as an integral part of the nozzle, having a shape/diameter to restrict flow.

Figure 3:
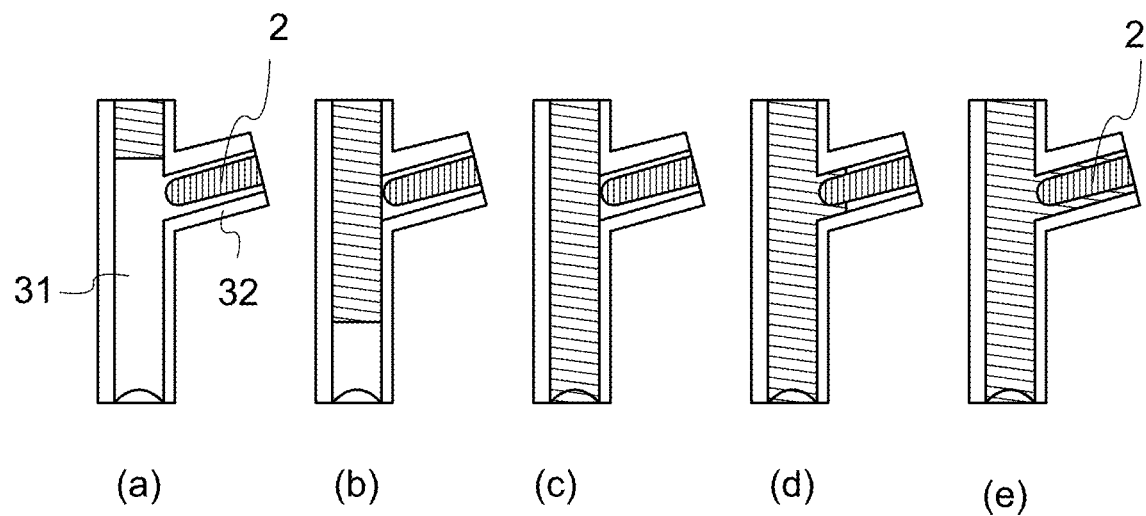
FIG. 3a-3e show the water flow in an assembly such as that shown in FIG. 1.
Figure 4:
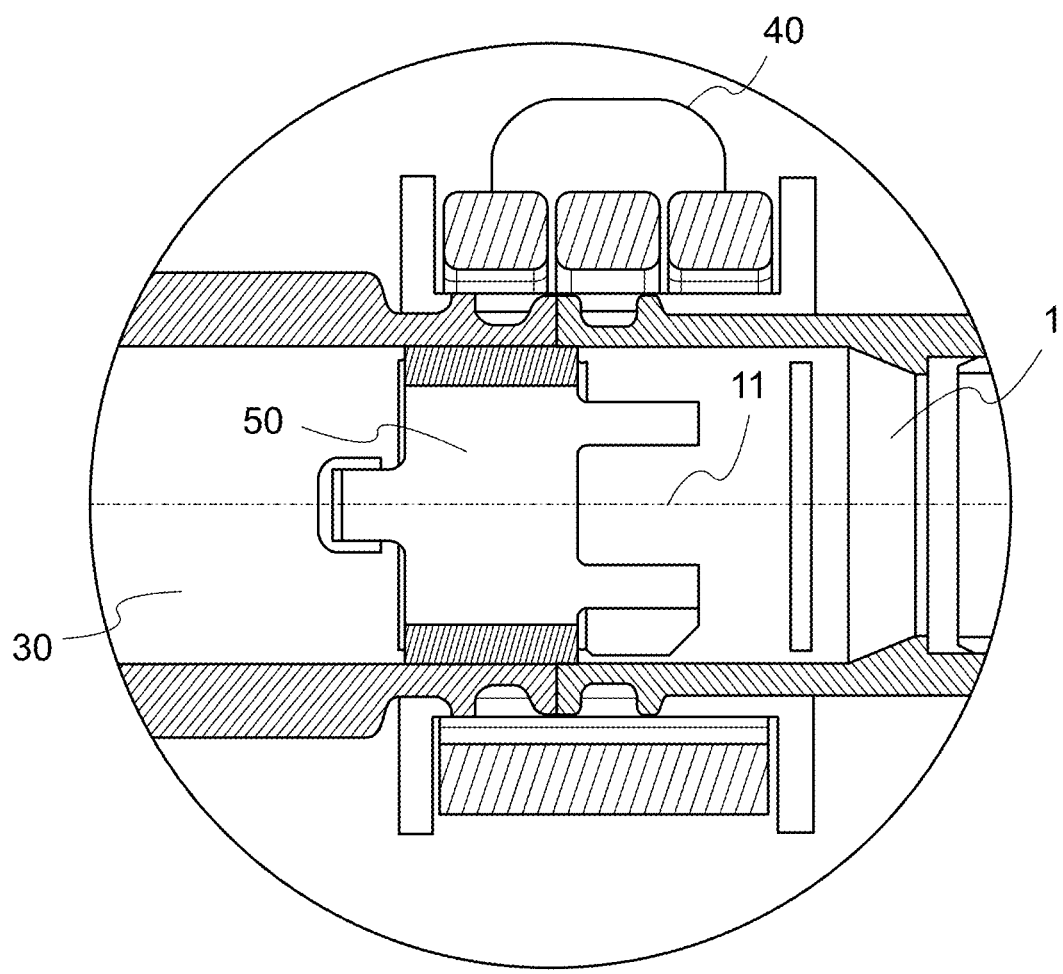
FIG. 4 is a cross-section of the assembly of FIGS. 1 and 2.
Figure 5:
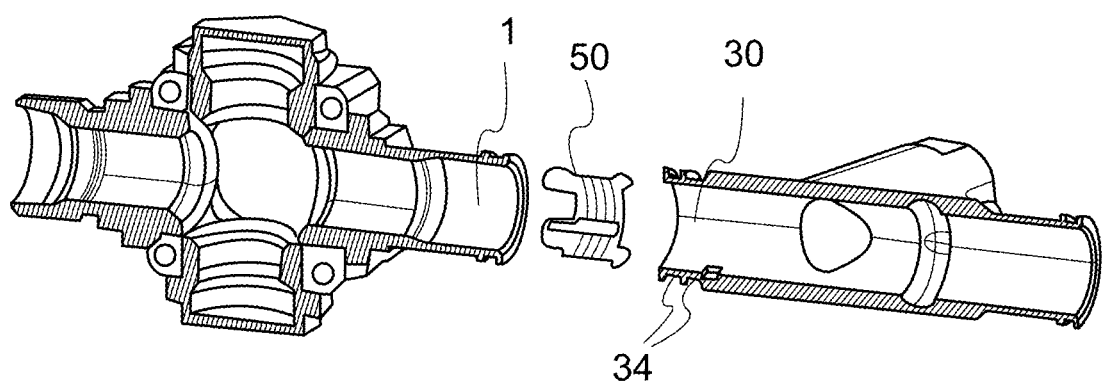
FIG. 5 is an exploded cross-section view of the assembly of FIG. 4.

The flow, with this modified wye fitting, will be described with reference to FIG. 7. As water (e.g. drain water) begins to flow in the waste pipe 20 (FIG. 7(*a*)) some of that water will be diverted into the nozzle 60 at the wider opening 61, the pressure of that water will be increased at the smaller opening 62 and will be directed as a jet at the sensor 2 at the higher pressure to clean the sensor 2 (FIG. 7(*b*)). This is in contrast to the first design, without the nozzles, where, as seen in FIG. 3, the water does not reach the sensor 2 until it has filled the first branch 31. As water continues to flow in the first branch and, at the same time in the second branch, from the nozzle (FIG. 3(c)), the sensor 2 becomes fully covered before the first branch 31 has filled, thus causing the valve 1 to open (FIG. 7(d)) sooner than seen in FIG. 3. The valve is then already open as the water in the first branch reaches it (FIG. 7(e)).

In addition to providing cleaning of the sensor during operation as described above, the nozzle design provides further advantages over the design without the nozzles described above.

In the design without the nozzles, as mentioned above, water first flows to the closed valve 1 (FIG. 3(c)) before starting to cover the sensor (FIG. 3(e)). Because the water pressure flowing into the second branch is low, there is a risk of air bubbles developing in the sensor area which can affect the area of coverage of the sensor and, therefore, its accuracy. There is a risk, then, that the sensor senses the full state later than it should. With the improved nozzle design, the sensor is cleaned and, in addition, the risk of creation of air bubbles is reduced.

The modified wye fitting can be designed to be attached to any valve type, with or without the connector described above in the first aspect.

The nozzles 60 are formed integrally with the wye fitting 30. This could be performed by additive manufacturing to reduce costs and manufacturing/assembly time. Also, the nozzles 60 with integral filter 65 can be additively manufactured.

The aspects of the assembly of this disclosure described above provide a number of advantages over existing arrangements. The parts can be additively manufactured thus reducing costs. The connector feature provides for quicker assembly without the need for additional fastening components while still using a standard clam shell clamp. With the nozzle design, the valve detects water flow sooner as the risk of a water gap is reduced. The features of the disclosure can be used with many types of valve and in many types of flow system and with different fluids.

The invention claimed is:

1. A fluid level sensor assembly comprising:
a wye fitting having a main branch defining a fluid path for a fluid to flow from an inlet end to an outlet end arranged to be connected to an inlet of a valve, and a second branch opening from the main branch at a position intermediate the inlet end and the outlet end;
a level sensor is located in the second branch to detect a level of fluid in the second branch and to generate a command signal for operation of the valve according to the level detected; and
a nozzle defining a channel outside the main branch, the channel having a first opening into the main branch, at a position intermediate the inlet end and the second branch, and a second opening into the second branch, the second opening being smaller than the first opening.

2. The assembly of claim 1, further comprising an insert fitted to the outlet end of the wye fitting and extending axially from the end to be fitted to an inlet of a valve, in use, wherein the insert is configured to secure the wye fitting against rotation relative to the valve inlet when the insert is fitted to the valve inlet.

3. The assembly of claim 2, wherein the insert comprises locking features to provide an anti-rotation fit between the outlet end and the valve inlet.

4. The assembly of claim 3, wherein the locking features comprise teeth.

5. The assembly of claim 3, wherein the locking features comprises latches configured to latch into corresponding openings formed in a receiving part.

6. The assembly of claim 1, wherein the insert comprises a polymer.

7. A fluid management system comprising:
the valve; and
the assembly as claimed in claim 1.

8. The system of claim 7, further comprising a waste pipe arranged for connection with the valve via the assembly.

* * * * *